United States Patent
Bordes et al.

(10) Patent No.: US 7,003,037 B1
(45) Date of Patent: Feb. 21, 2006

(54) PROCESS, DEVICE AND USE FOR EVALUATING CODED IMAGES

(75) Inventors: Philippe Bordes, Pont-Pean (FR); Philippe Guillotel, Vern sur Seiche (FR)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 09/936,033

(22) PCT Filed: Feb. 29, 2000

(86) PCT No.: PCT/EP00/01688

§ 371 (c)(1),
(2), (4) Date: Sep. 7, 2001

(87) PCT Pub. No.: WO00/54220

PCT Pub. Date: Sep. 14, 2000

(30) Foreign Application Priority Data

Mar. 8, 1999 (FR) .................................... 99 02827

(51) Int. Cl.
*H04N 7/12* (2006.01)
(52) U.S. Cl. .................................. 375/240.16; 382/107
(58) Field of Classification Search ........... 375/240.16, 375/240.2, 240.11, 240.19, 240.27, 240.29, 375/240.12; 382/271, 254, 180, 239, 107, 382/236, 240; 348/180, 398.1, 416.1, 439.1, 348/578, 416
See application file for complete search history.

(56) References Cited

U.S. PATENT DOCUMENTS

| 4,984,076 | A | * | 1/1991 | Watanabe et al. ........ 375/240.2 |
| 5,128,756 | A | * | 7/1992 | Johnston et al. ....... 375/240.12 |
| 5,574,500 | A | * | 11/1996 | Hamada et al. ............. 348/180 |
| 5,701,163 | A | * | 12/1997 | Richards et al. ............ 348/578 |
| 5,734,737 | A | * | 3/1998 | Chang et al. ............... 382/107 |
| 5,748,761 | A | * | 5/1998 | Chang et al. ............... 382/107 |
| 5,764,813 | A | * | 6/1998 | Murayama et al. ......... 382/271 |
| 5,937,097 | A | * | 8/1999 | Lennon ...................... 382/236 |
| 5,991,458 | A | * | 11/1999 | Kunitake et al. ........... 382/254 |
| 6,236,756 | B1 | * | 5/2001 | Kimura et al. .............. 382/239 |
| 6,271,825 | B1 | * | 8/2001 | Greene et al. .............. 345/694 |
| 6,674,911 | B1 | * | 1/2004 | Pearlman et al. ........... 382/240 |
| 6,735,253 | B1 | * | 5/2004 | Chang et al. .......... 375/240.16 |

OTHER PUBLICATIONS

Stefan J.P. Westen et al., *A Quality Measure for Compressed Image Sequences Based on an Eye-Movement Compensated Spatio-Temporal Model*, Oct. 1997, IEEE, pp. 279-282, The Netherlands.

Tsuhan Chen, *Elimination of Subband-Coding Artifacts Using the Dithering Technique*, Nov. 1994, IEEE, pp. 874-877, AT&T Bell Labs, USA.

* cited by examiner

*Primary Examiner*—Gims Philippe
(74) *Attorney, Agent, or Firm*—Joseph S. Tripoli; Ronald H. Kurdyle; Joseph J. Opalach

(57) ABSTRACT

A process for evaluating the quality of coded images (e.g., two video sequences) uses a homogeneous motion vector field and psychovisual filtering to take into account Human Visual System (HVS) characteristics to calculate the error between the two video sequences.

32 Claims, 4 Drawing Sheets

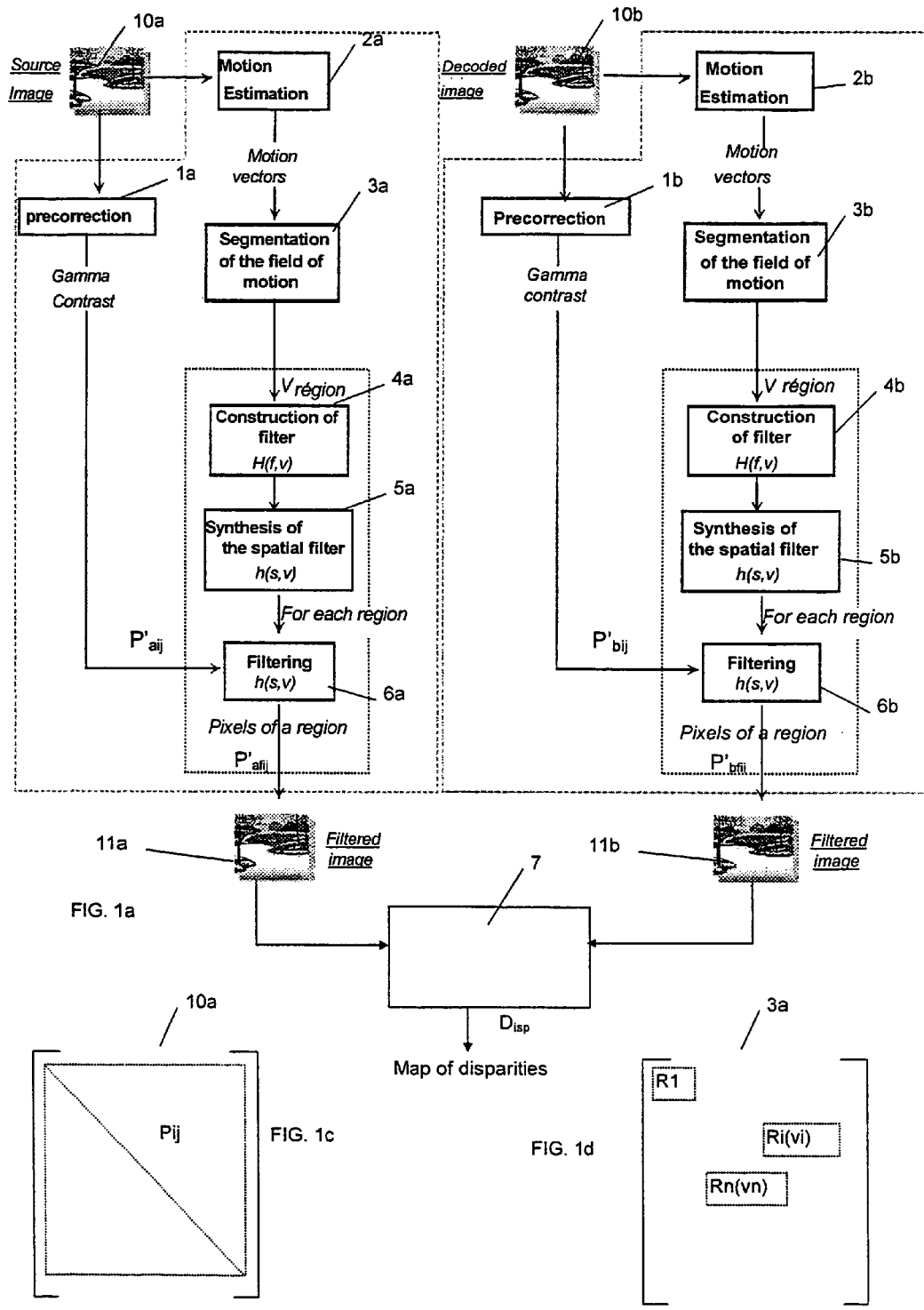

Figure 1B:
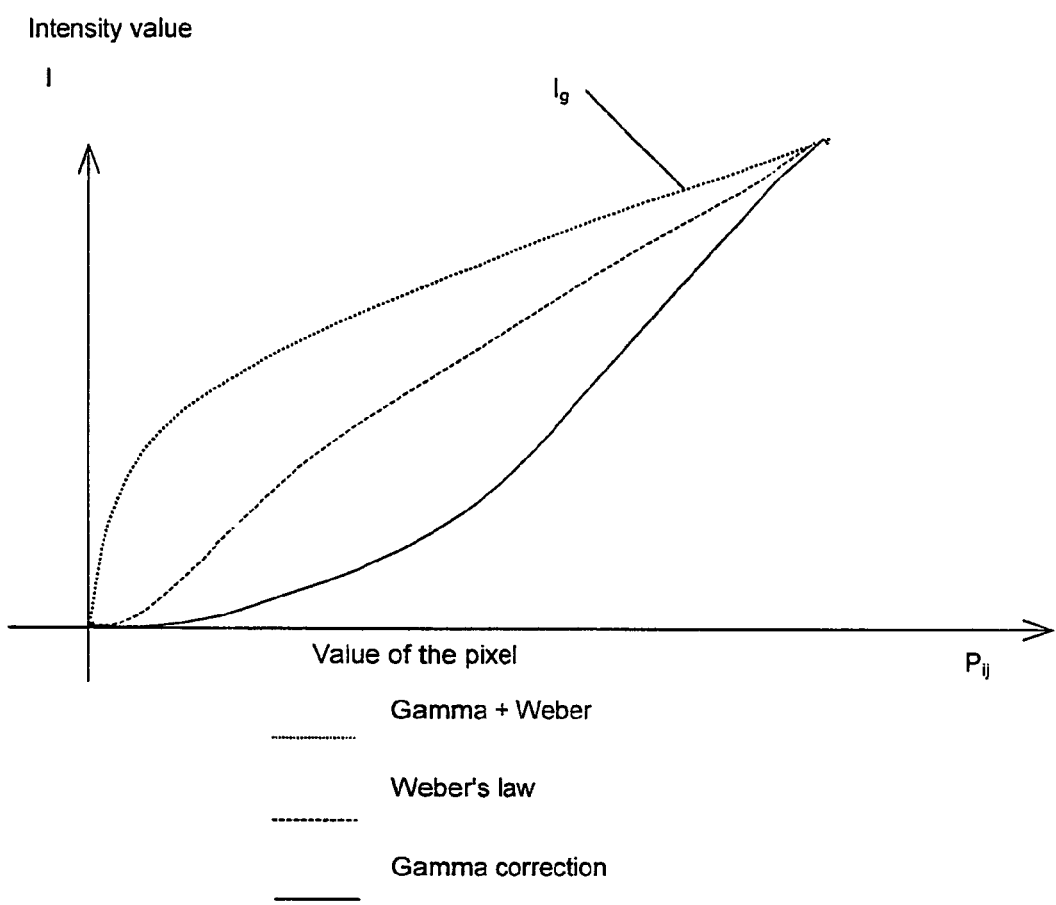

*level-0*
*level-1*
*level-2*
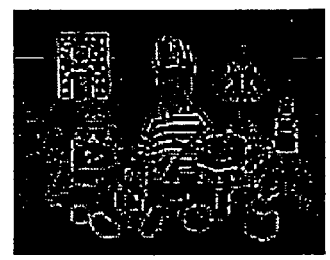
FIG.4
FIG. 5

PROCESS, DEVICE AND USE FOR EVALUATING CODED IMAGES

This application claims the benefit under 35 U.S.C. § 365 of International Application PCT/EP00/01688, filed Feb. 29, 2000, which claims the benefit of French Patent Application No. 9902827, filed Mar. 8, 1999.

The present invention relates to a process and a device for evaluating the quality of coded images as well as to the use of such a process and a device.

In systems for coding digital video sequences, it is known practice to estimate the quality of the images output by the procedure by comparison with the original image, using the signal-to-noise ratio.

This ratio is generally termed the PSNR (Peak Signal to Noise Ratio) and obtained by summing the quadratic differences of the pixels of the final image and of the original image.

However, this measure does not take into account the psychovisual characteristics of human vision (HVS: Human Visual System). Indeed, the human eye is more sensitive to certain spatial frequencies and its perception of the details of objects is strongly linked with their relative motion and also with the phenomena of luminosity and contrast.

Thus a sequence, which can, according to the traditional quality estimation procedure, appear as the outcome of good coding and be assumed to have a good image quality, will not be perceived in this manner by the observer, given his psychovisual characteristics.

The object of the invention is therefore to allow assessment of the quality of images which approximates as closely as possible to the perception which the observer will have thereof.

The influence of the human factor (HVS) is partially taken into account in traditional coders of MPEG2 type in the perception of the spatial frequencies of the decoded images by using a weighting matrix on the high frequencies of the 8 by 8 image blocks, but absolutely no account is taken as regards the perception of the details of objects in motion.

Most of the studies which measure the disparities between two images are essentially based on a static analysis of the defects taking no account of motion, or else on an analysis of the spatial frequencies.

Additionally, the few prior studies which take the temporal aspect into consideration, but take no account of the motion proper, use the difference (distortion) between a current macroblock and the macroblock in the same position in the preceding image.

None of these studies considers the influence of human vision together with the problems of motion in the image.

The purpose of the invention is to alleviate the drawbacks of the prior art.

This purpose is achieved by the fact that the process for evaluating the quality of images comprises:
a) a step of processing the signal representative of the image so as to obtain a processed signal,
b) a step of constructing on the basis of the signal representative of the coded image, a signal representative of the field of motion image on the basis of the source sequence,
c) a step of building a signal representative of the segmenting of the field of motion and of storing the image pixels representative of each region having a different field of motion at an address defined with respect to the velocity vectors estimated in the step of constructing the field of motion making it possible to determine the pixels having different velocity vectors,
d) a step of determining or of calculating a psychovisual human filter to be applied as a function of the estimated velocity of the region,
e) a step of filtering the processed signal, and
f) a step of constructing the map of disparities between the signals representative of the image which are obtained after the filtering step and the signals representative of the decoded image which are obtained after the filtering step.

According to another particular feature, the process for evaluating the quality of images comprises a step consisting in applying each of the steps to the source image and to the decoded image.

According to another particular feature, the process for evaluating the quality of coded images comprises a step of frequency decomposition of the images (FFT, subband, etc.) which precedes the filtering step and consists of a weighting by a coefficient deduced from curves taking into account the estimated velocity and the frequency band considered, so as to take account of the relative influence of the velocity and of the spatial frequency on the perception of the moving images.

According to another particular feature, the psychovisual filtering step is applied to matrices representative of the inter-pyramid differences between the Laplace pyramids of the processed source images and those of the processed decoded images after weighting by, on the one hand, the local influence representative of the frequency of the pixel concerned and, on the other hand, a filtering coefficient deduced from filtering curves taking into account the estimated velocity and the frequency band corresponding to the level of the Laplace pyramid to which the pixel belongs in a multiresolution pyramid obtained by constructing a pyramid on the basis of the image of each region of different velocity.

According to another particular feature, the psychovisual filtering curves are either built from a succession of curves arranged in the form of a database and stored in the system, and possibly interpolation on the basis of these curves, or obtained by analytical representation implemented by calculation means making it possible to calculate each curve.

According to another particular feature, the step of constructing the map of disparities is performed by recomposing the filtered multiresolution pyramids obtained in the preceding step.

According to another particular feature, the step of processing the image comprises a step of decomposing the source and decoded images into a Laplace pyramid of n levels and a step of constructing the inter-pyramid difference.

According to another particular feature, the velocity or local value of the motion is obtained by possible construction of filters followed by application of the filter constructed or by application of a median filter.

According to another particular feature, the process comprises a step of precorrecting the images by performing a Gamma correction and a correction by Weber's law.

According to another particular feature, the Gamma correction is performed by a device implementing the following formula:

$$y = KSV^{\gamma}$$

with $V = kaE^{\gamma a}$ in which y is the luminance, V the luminance voltage, E the illumination of the analysed image γ is an exponent of around 2.2 for black and white picture tubes and γa has a value of 0.45 commonly agreed for colour television.

According to another particular feature, the filtering is obtained by constructing the psychovisual filter corresponding to the velocity estimated on the basis of a database of filters and interpolation between the two filters corresponding to the regions closest to the region whose velocity has been estimated.

According to another particular feature, the relative local influence ($I_n$) of the pixel $p_i$ concerned is obtained by calculating a value $E_n$ representing the $q^{th}$ power of the inter-pyramid level-to-level difference between the source pyramids and decoded pyramids of like level of the pixel concerned.

According to another particular feature, the calculation of In is performed by using the following formula:

$$I_n = \frac{E_n}{\sum_{k<n} m(E_k)}$$

with $E_n = (\text{Diff}_n(p_{ij}))^q$,
$m(E_k) = E_k$ if $E_k > S$
and $m(E_k) = S$ if $E_k < S$
with for example S=0.5% (maximum possible value of $E_k$).

According to another particular feature, the filtering comprises a directional filtering of the images in a determined direction rather than in another.

According to another particular feature, the Gamma correction is performed by a calculation device implementing the following equation:

$$L_{display} = L_{max}\left(\frac{e}{e_{max}}\right)^\gamma$$

e being the grid level value of the pixel, $e_{max}$ being the maximum value example 256 if the coding is performed on 8 bits, $L_{max}$ being the intensity corresponding to $e_{max}$ in cd/m².

According to another particular feature, Weber's law is implemented by a calculation device which carries out the following function:

$$v_{out} = \frac{L_{max}}{2} \text{Log}_{10}\left(1 + 100\frac{L_{display}}{L_{max}}\right)$$

According to another particular feature, the calculation of the psychovisual filter is obtained by a device implementing the following formula:

$G(\alpha,v) = [6.1 + 7.3(\log(v/3)^3] \times v\alpha^2 \exp[-2\alpha(v+2)/45.9]$ with $\alpha = 2\pi f$, f=spatial frequency, v=velocity.

Another purpose of the invention is to propose a use of the process according to the invention.

This other purpose is achieved by the fact that the process of the invention is used in a coding device, by a dynamic retroaction as a function of the psychovisual disparities calculated by the calculation device implementing the process of one of the parameters used by the coding device in the course of the coding.

According to another particular feature, the calculated disparities are compared with a threshold so as to modify the coding parameters of the coding apparatus until the desired threshold is overstepped.

According to another particular feature, one of the coding parameters is either the quantization interval, or the size of the images, or the form of the group of pictures GOP.

According to another particular feature, the process of the invention is used in the analysis of the homogeneity of the calculated disparities so as to act on the coding parameters.

According to another particular feature, the process of the invention is used to modify the coding parameters of the different objects of an image whose coding is object oriented as a function of a constant desired disparity.

According to another particular feature, the process of the invention is used to perform a dynamic reallocation of the allocated bit rates.

A last purpose of the invention is to propose a device implementing the process.

This purpose is achieved by the fact that the evaluating device comprises:

a means (1a, 1b) of processing the signal representative of the source image (10a) and of the decoded image (10b) so as to obtain a processed source image signal and a processed decoded image signal, means (2a, 2b) of constructing on the basis of the signal representative of each of the images, a signal representative of the estimating of the field of motion on the basis of each of the images of the source and decoded sequences, means (3a, 3b) of building a signal representative of the segmenting of the field of motion and of storing the image pixels representative of each region $R_i$ having a different field of motion at an address defined with respect to the velocity vectors estimated in the step of constructing the field of motion making it possible to determine for each of the source and decoded images those having different velocity vectors, a means (4, 5) of determining or of calculating a psychovisual human filter to be applied as a function of the estimated velocity of the region, means (6a, 6b) of filtering applied to each of the processed source images and processed decoded images and a means (7) of constructing the map of disparities between the signals representative of the processed source image which are obtained after the filtering step and the signals representative of the processed decoded image which are obtained after the filtering step.

According to another particular feature, the psychovisual filtering means are applied to matrices representative of the inter-pyramid differences calculated by calculation means between the Laplace pyramids of the processed source images and those of the processed decoded images after weighting by, on the one hand, the local influence representative of the frequency of the pixel concerned and, on the other hand, a filtering coefficient deduced from stored or calculated filtering curves and taking into account the estimated velocity and the frequency band corresponding to the level of the Laplace pyramid to which the pixel belongs in a multiresolution pyramid obtained by means of constructing this multiresolution pyramid on the basis of the image of each region of different velocity.

According to another particular feature, the means of constructing the map of disparities perform a recomposition of the filtered multiresolution pyramids.

According to another particular feature, the means of processing, the means of building, the means of determining, the means of constructing, the means of filtering consist of at least one microprocessor associated with memories sufficient to contain the programs making it possible to embody the various means and to contain the databases and the intermediate information necessary for the calculation and for obtaining the map of disparities.

Figure 2:
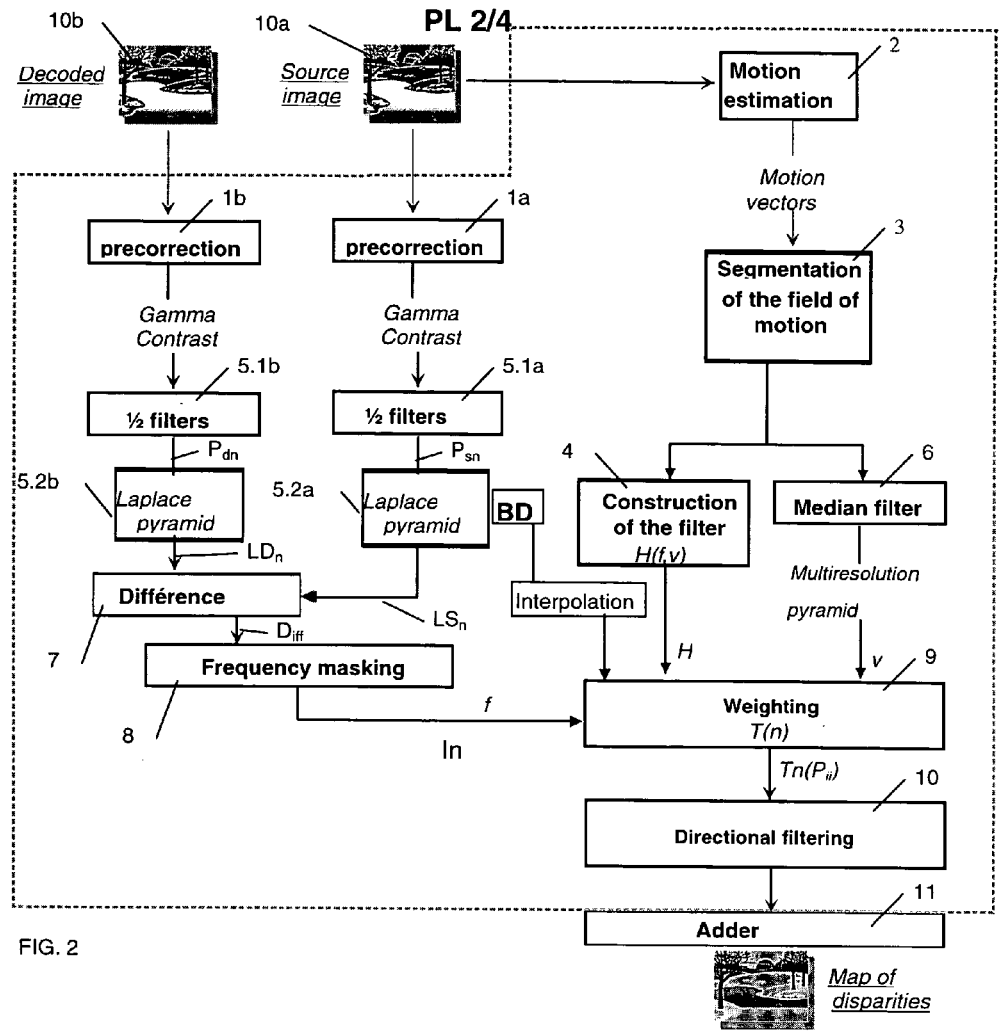
Figure 3:
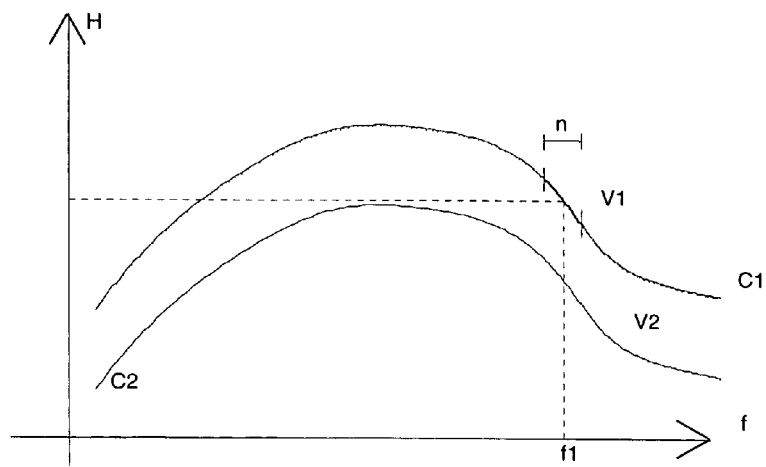

Other particular features and advantages of the present invention will become more clearly apparent on reading the description given hereinbelow with reference to the appended figures in which:

FIG. 1a represents a schematic view of the steps of a first variant of the process, FIG. 1b represents a graphic representation of the result of the preprocessing steps, FIG. 1c represents a simplified view of the source image matrix, FIG. 1d represents a simplified view of the matrix obtained after segmenting the field of motion, FIG. 2 represents a schematic view of the various steps of a second variant of the process, FIG. 3 represents the family of filtering curves corresponding to the psychovisual influence of human vision, which curves are stored in a database for determined velocities, FIG. 4 represents the multiresolution pyramid, FIG. 5 represents the Laplace pyramid.

A first variant embodiment of the invention will be explained with the aid of FIG. 1a in which the steps carried out, by the device allowing the evaluation of the quality of the images at the output of a coding procedure, are obtained through various devices which process, on the one hand the signals from a source image (10a) and on the other hand the signals representative of a decoded image (10b). Each image is represented by a plurality of pixels $p_{ij}$ arranged as a matrix, as represented in FIG. 1c, and whose size depends on the definition desired for the image. To a given pixel $p_{ij}$ there corresponds a size of characteristic details, which is expressed as a function of the size of the matrix defining the number of pixels in the image, on the one hand by the frequency in cycles and on the other hand by the velocity in degrees per second. Each of the steps of the process according to the first variant embodiment is applied both to the source image and to the decoded image. The expression decoded image should be understood to mean any video image obtained at the output of a coding decoding device allowing transmission according to a standard such as, for example, MPEG. To fix matters better, the reader may also refer to appendix 1 which represents the various steps numbered from 1 to 7 of the process implemented according to the first variant.

A first device (1a, 1b) for preprocessing source images (10a) and decoded images (10b) makes it possible to implement a first step of processing termed the preprocessing step carrying out a Gamma correction of the signals representative of the image and a correction of the contrast by a Weber law. Weber's law takes account of the fact that the eye is sensitive to contrasts and that when gazing at a light spot of intensity I+dI on a background having a luminous intensity I, the ratio dI/I, called Weber's ratio, is practically constant at around 2% over a wide luminous threshold range, except for the very low luminous intensities and the very high luminous intensities. The correction of contrast takes into account a form of saturation of the eye linked with the fact that, for example, a zone of average intensity alongside a zone of high intensity will be less well distinguished than a zone of low intensity alongside a zone of average intensity.

To take this effect into account, the voltage signal which will control the luminous intensity of the display performed by the cathode-ray tube is corrected by a so-called Weber law expressed hereinbelow:

$$v_{out} = \frac{L_{max}}{2} \text{Log}_{10}\left(1 + 100 \frac{L_{display}}{L_{max}}\right)$$

in which $L_{max}$ represents the maximum luminous intensity approximately equal to one hundred candela per square meter ($L_{max} \approx 100$ cd/m$^2$) and $L_{display}$ the desired luminous intensity.

This mathematical law is implemented by an electronic device making it possible to perform these calculations. By way of example, such a device can be built from a microprocessor associated with memories which contain the program corresponding to the calculation algorithm.

For its part, the Gamma correction makes it possible to obviate the response of the television, that is to say the characteristics of the tube allowing display. Indeed, cathode-ray tube display devices are nonlinear devices and the light intensity reproduced on the screen of a cathode-ray monitor is not, in the absence of correction, proportional to its input voltage. Gamma correction is a procedure for compensating for this nonlinearity so as to obtain correct and proportional reproduction of the corresponding luminous intensity at the input voltage. The image from a screen is subdivided into pixels organized as a matrix in which the position of the pixel $p_{ij}$ is defined by the indices i and j of the matrix. The value $p_{ij}$ of the pixel is representative of the desired intensity. To correct the phenomena linked with the cathode-ray tube, a correction law which corresponds to the following equation:

$$L_{display} = L_{max}\left(\frac{e}{e_{max}}\right)^\gamma$$

is applied to this value representative of the voltage intended to obtain the desired luminous intensity, Gamma ($\gamma$) having a value of between 2.3 and 2.6 depending on the particular features of the cathode-ray tube. In this formula, e is the grid level of the value of the pixel $p_{ij}$, $e_{max}$ is the maximum possible value of e, for example 256, if the control signals are expressed on 8 bits, and $L_{max}$ is the intensity corresponding to $e_{max}$ in cd/m2, Lmax being approximately equal to 100 cd/M$^2$.

Another formulation of the Gamma law can be as follows:

$$y = K_s V^\gamma$$

with $V = kaE^{\gamma a}$ in which y is the luminance, V the luminance voltage, E the illumination of the analysed image, $\gamma$ is an exponent of around 2.2 for black and white picture tubes and $\gamma a$ corresponds to a value of 0.45 commonly agreed for colour television, Ks and ka proportionality coefficients.

This Gamma correction and Weber operation makes it possible to transform the pixel value received as input to the preprocessing circuit (1a) into a final value $P'_{ij} = I_g (P_{ij})_{Pij} \cdot I_g$ which follows the law corresponding to curve 1 represented in FIG. 1b. Each of the source images (10a) gives rise to a plurality of preprocessed pixels $p'_{aij}$ and each of the decoded images (10b) likewise gives rise to a second plurality of preprocessed pixels $p'_{bij}$.

In parallel with this processing operation, a second step (2a, 2b, FIG. 1) of so-called motion estimation which allows the construction for each source and decoded image of the field of motion image, is implemented on the basis of each image sequence. This construction of the field of motion is performed between t and t−1 by conventional calculations, such as those calling upon the method explained in the book published by Don Pearson, MacGraw Hill Book Company and entitled "Image processing" "The Essex series in telecommunication and information systems", page 47 et seq. This estimation of motion over a sequence of images can use either the differential method, or the method of block matching, or the Fourier method or the method of estimation in three-dimensional space. For each image, a certain number of motion vectors ($v_i$) are thus obtained and the image can thus be partitioned into regions ($R_1, \ldots R_i v_i, \ldots, R_n v_n$, FIG. 1d) based on the motion information, each region ($R_i v_i$) is therefore characterized by the fact that all the pixels of this region have a single associated velocity vector ($v_i$). This splitting of the image into constant velocity regions constitutes a third step (3a, 3b) of so-called segmentation of the field of motion, applied to each source and decoded image. A field of motion is therefore rendered homogeneous by virtue of the segmentation technique and the nearby pixels of motion are grouped into one and the same region. This field of motion thus segmented is then closer to the true motion of the objects of the scene represented by the images. This homogenization thus makes it possible to perform a slight denoising and to have a reduced number of different motions corresponding to a small number of velocities $v_i$, thereby reducing the number of filters to be calculated and to be stored in the next step so as to avoid having $(255)^2$ motions to be calculated and to be stored in the context of an image consisting of 255*255 pixels $p_{ij}$. The estimation of the motion can also use the technique relying on the extraction of particular objects in the scene, such as edges or corners of objects consisting in following the motion of these particular elements from one image to another. This provides information regarding motion at different locations of the image and an interpolation procedure is used to assign motion vectors to the remaining image areas. One way of measuring the motions of the angles or edges of elements consists in applying a high pass filter to the image so as to isolate the edges and thereafter to use the technique relying on the method of differentials to measure the value of the motion. The formation of borders can be attenuated with the aid of a low pass filter so as to reduce the effects of noise and allow the measurement of large motions. A low pass filter can, for example, be built for a matrix space of dimension 3—3 via the following matrix:

| 1 | 1 | 1 |
|---|---|---|
| 1 | 1 | 1 |
| 1 | 1 | 1 |

A high pass filter can, for example, be built for a matrix space of dimension 3—3 via the following matrix:

| −0.125 | −0.125 | −0.125 |
|---|---|---|
| −0.125 | 1 | −0.125 |
| −0.125 | −0.125 | −0.125 |

Thus, a table giving for an estimated velocity v the pixels $p_{ij}$ of the image which belong to this region having this estimated velocity v in cycles per degree is stored in the form of the matrix of FIG. 1d in the storage means of the device for segmenting the field of motion with a view to the subsequent use thereof.

The procedure is continued via a fourth step implemented in parallel for each of the source (10a) and decoded (10b) images consisting in constructing a psychovisual filter (4a, 4b) for each. This fourth step is performed, for example, using a database of filter curves comprising a plurality of curves such as those represented in FIG. 3 expressing the influence of the human factor H as a function of the velocity of the motion $v_i$ and of the spatial frequency $f_i$. To these values $v_i$, $f_i$ there corresponds a filtering value H. If the velocity $v_i$ lies between the velocities $v_1$ and $v_2$ of two curves ($Hv_1$, $Hv_2$), the device performs an interpolation so as to determine the corresponding value H. This interpolation can, for example, be linear. This step can also be performed by direct calculation of the value H for a given velocity on the basis of an analytical model of the psychovisual influence. The analytical model of the filter can, for example, be represented by the following formula:

$$G(\alpha,v)=[6.1+7.3|\log(v/3)|^3]\times v\alpha^2 \exp[-2\alpha(v+2)/45.9]$$
with $\alpha=2\pi f$.

In the fifth step, the device synthesizes a filtering value h(s,v) in the spatial domain for each filtering value $H(f_s,v)$ in the frequency domain and associated with a velocity v and a frequency $f_s$ by applying an inverse fast Fourier transform ($FFT^1$) to the filtering values $H(f_s,v)$ in the frequency domain, this being expressed by the expression $h(s,v)=FFT^1[H(f_s,v)]$ where fs represents the characteristic size of the details in cycles per degree, v their motion expressed in duration per second and s the resolution.

The value h thus determined of the spatial domain for each source image (5a) and decoded image (5b) in the fifth step will be applied in the course of a sixth step (6a, respectively 6b) to each of the preprocessed pixels $p'_{aij}$ of the source image emanating from the preprocessing and of the decoded image $p'_{bij}$ emanating from the preprocessing.

On each occasion, this sixth filtering step (6a, 6b) results in a pair of filtered pixel values $p'_{afij}$ and $p'_{bfij}$ which is thereafter used in a last step (7) of constructing a matrix of disparities ($D_{isp}$) by calculating the quadratic error between each pair of pixel values.

$$D_{isp}=(p'_{afij}-p'_{bfij})^n \text{ with } n=2 \text{ or other}$$

This matrix will thus give an objective assessment of the distortions perceptible to the human eye which are introduced by the coding decoding procedure which one wishes to estimate.

The second variant embodiment of the invention will now be explained in conjunction with FIG. 2 which represents the various means allowing the implementation of the process according to this second variant. To fix matters better, the reader may also refer to appendix 2 which represents the various steps numbered from 1 to 11 of the process implemented according to the second variant and which also represents the decrease in size obtained through the operations of constructing the Laplace pyramids.

In this variant, the first four steps of the first variant are applied to the source image (10a), namely the precorrection (1a), the construction of motion fields (2a) and the segmentation (3a) as well as the construction of the psychovisual filter (4a). The pixels $p_{aij}$ originating from the processing of the source image (10a) and resulting from the preprocessing step and the pixels $p_{bij}$ resulting from the step of preprocessing the decoded image (10b) are each subjected in a step (5.1a and respectively 5.1b) to a ½ decimation filtering ($F_{1/2}$). This filtering is a low pass filtering which makes it possible on the basis of a matrix of pixels representing an image $P_{n-1}$ of a given level n-1 to obtain the image $P_n$ of next level n. This is expressed by the relation:

$$P_n = F_{1/2}(P_{n-1}) \text{ with } n > 0$$

$P_0$ being the original image.

By way of example the decimation filter can be built for a 3.3 matrix space via the following matrix:

| 1 | 2 | 1 |
|---|---|---|
| 2 | 4 | 2 |
| 1 | 2 | 1 |

This operation of ½ decimation filtering by a calculation device has the result of reducing a matrix of pixels of size m·n representing the source image $P_{s0}$ to a level 1 matrix $P_{s1}$ of size m/2·n/2, the matrix $P_{sn}$ of level n being of size m/2n·n/2n. Likewise, this ½ decimation filtering operation has the result of reducing a matrix of pixels of size m·n representing the decoded or corrupted image $P_{d0}$ to a level 1 matrix $P_{d1}$ of size m/2·n/n/2, the matrix $P_{dn}$ of level n being of size m/2n·n/2n. Therefore, for each source and decoded image, the calculation device stores the level n and the next level n+1 in its memory.

Thereafter, in the next step (5.2a, respectively 5.2b), the calculation device deducts from each image $P_n$ of level n, the image $P_{n+1}$, of immediately succeeding level, expanded by 2 ($E_2$) so as to obtain what is referred to appropriately as a succession of matrices constituting what is referred to appropriately as a Laplace pyramid Ln, according to the formula:

$$Ln = P_n - E_2(P_{n+1}) \text{ for } n < N$$

with $L_N = P_N$.

The expansion operation performed by $E_2$ consists in interpolating the image $P_{n+1}$ (of size m/2*n/2) to obtain an image of size m*n.

This expansion or interpolation operation involves several interpolation matrices as a function of the position of the pixel to be interpolated.

This makes it possible to build, for the source image, a pyramid $LS_n$ of stored matrices and for the decoded or corrupted image a second pyramid $LD_n$ of stored matrices. Depending on the choice of the filter F½, the image $LS_n$ obtained at the end of the above step is a good approximation of the energy included within a frequency band centred around the value $f_n = 1/(n+1)$. For further details regarding Laplace pyramids or so-called Gaussian pyramids and regarding expansion matrices, the reader may refer to the article "the Laplacian pyramid as a compact code image" published in the journal IEEE transactions on communications VOL. COM. 31, No. 4, April 1983 pages 532 to 540 authors P. J. Burt and Ed. H. Adelson.

The Laplace pyramids ($LS_n$, $LD_n$) are obtained via steps (5.2a. and 5.2b).

In the next step, the device constructs, on the basis of the regions ($R_i v_i$) characterized by the same velocity vector ($v_i$) and defined at the output of the motion field segmentation step (3) applied to the source image, a multiresolution pyramid $R_n$ of the region image, starting from the original region image $R_0$ and by applying to this original region image $R_0$ a ½ decimation median filter $G_{1/2}$ according to the formula:

$$R_n = G_{1/2}(R_{n-1})$$

$R_0$ = the original region image.

For further teaching regarding the building of a median filter known to the person skilled in the art, the reader may refer to chapter 4 of the book entitled "nonlinear digital filters, principles and applications" published in 1990 by Kluwer Academic Publishers, by I. Pitas and A. N. Venetsapoulos.

The (multiresolution) motion pyramid is produced only for the source image (10a) and the value of the pixel of $LS_n$ and $LD_n$ represent the energy which there is in a frequency band whereas via $R_n$ one has the motion.

In this step, the calculation device does not perform the calculation corresponding to step 5.2, that is to say to the subtraction of the image $R_n$ corresponding to each level n from the image $R_{n+1}$ of the immediately succeeding level n+1 expanded by 2. At this calculation step, the matrices constituting the multiresolution pyramid are stored and make it possible to obtain for each pixel of each level n of $R_n$ a local value of the motion. The median filter of a window of n·m pixels is obtained by ranking the values of the pixels and by retaining the pixel having the median value.

The application of the median filter $G_{1/2}$ to the matrix of pixels $R_n$ of dimension m*n makes it possible to obtain a matrix $R_{n+1}$ of dimension m/2*n/2. The decimation operation is included in that of the median filter. The median filter has the same effect on the images $R_n$ as the filter $F_{1/2}$ on the images $P_n$: it reduces their size by 2 horizontally and vertically, except that instead of being a conventional matrix filter, this is a "median" filter, that is to say one based on an analysis of the local statistics.

The Laplace pyramids ($LS_n$, $LD_n$) calculated in step 5.2 are thereafter used in a step, represented in step 7, of calculating the level-to-level inter-pyramid differences according to the formula:

$$\text{Diff}_n = LS_n - LD_n.$$

This makes it possible to obtain matrices $\text{Diff}_n$, each coefficient of which expresses the values of the differences of the coefficients of the matrices of the source Laplace pyramid ($LS_n$) and decoded Laplace pyramid ($LD_n$) for the same level n and to do so for each level from 0 to n. In the Laplace pyramid $LS_n$ the value of the pixel represents the energy which there is in a frequency band. The frequency disparity between the two images is obtained for a given frequency band by taking the inter-pyramid difference $LS_n - LD_n$.

This result is in fact weighted by the sensitivity of the eye for this frequency which is expressed by the relation of the relative influence of the activity of the frequency $f_n$. This relative influence of the activity of the frequency $f_n$ can be masked by a large activity in the higher frequencies. To determine and take into account this relative influence of the activity in a masking step (8), the calculation device begins by evaluating the local influence $E_n$ of a pixel $p_{ij}$, which is defined by the value of the result of the calculation of the inter-pyramid differences, applied to the pixel $p_{ij}$, this result being raised to the power q:

$$E_n = (\text{Diff}_n(p_{ij}))^q$$

this local influence value allows the calculation device to determine a matrix expressing the relative influence of the activity through a circuit which implements the following formula:

$$I_n = \frac{E_n}{\sum_{k<n} m(E_k)}$$

with $m(E_k) = E_k$ if $E_k > S$
and $m(E_k) = S$ if $E_k < S$
with for example $S = 0.5\%$ (maximum possible value of $E_k$).

As in the previous variant, the calculation device performs a filtering step 4 by using a database (BD) containing a plurality of filtering curves expressing the influence of the human factor on the visual perception of the images. These filtering curves make it possible, on the basis of the values of the frequency and of velocity corresponding to a pixel $p_{ij}$ to determine a weighting coefficient H for this pixel. Thus, for each pixel $p_{ij}$ of the matrix $L_n$ corresponding to a velocity region $R_n$, the calculation device determines a value H which will weight the relative influence In. This weighting step (9) is obtained through a calculation device implementing the equation:

$$T_n(p_{ij}) = I_n(p_{ij}) \times H$$

The implementation of this equation makes it possible to obtain a pyramid of matrices. When the program of the calculation device selects a pixel from a matrix of level n of the Laplace pyramid, to this level n there corresponds a spatial frequency $f_n$ and the calculation device is able to associate that pixel of the image $R_n$ to which there corresponds a velocity value v. By using databases and curves recorded in these databases, the calculation device determines either directly, or by interpolation between two curves, the value of the gain coefficient H. In this second method, one works directly on objects (Laplace pyramids) which correspond to frequency quantities. There is therefore no need to switch to the spatial domain, since all the calculations are carried out in the frequency domain. This value H will weight the relative influence of the activity (In). This weighting step (9) makes it possible to obtain a pyramid of matrices to which may be applied an optional step (10) catering for directional filtering so as to take account of the psychovisual directions favoured by the human gaze.

Thus, it is possible to filter the images constituted by the matrices $T_n$ through directional filters favouring one direction with respect to others, these filters consisting of matrices of coefficients of dimension n·n corresponding to the dimension of the image factor $T_n$. An example of a 0° directional filter matrix is given below for a dimension 5/5.

| 0 | 0 | 0 | 0 | 0 |
|---|---|---|---|---|
| 0 | 0 | 0 | 0 | 0 |
| 0.094 | 0.141 | 0.28 | 0.141 | 0.094 |
| 0 | 0 | 0 | 0 | 0 |
| 0 | 0 | 0 | 0 | 0 |

An example of a 90° directional filter matrix is given below.

| 0 | 0 | 0.125 | 0 | 0 |
|---|---|---|---|---|
| 0 | 0 | 0.188 | 0 | 0 |
| 0 | 0 | 0.375 | 0 | 0 |
| 0 | 0 | 0.188 | 0 | 0 |
| 0 | 0 | 0.125 | 0 | 0 |

An example of a 45° directional filter matrix is given below.

| 0.016 | 0 | 0 | 0 | 0 |
|---|---|---|---|---|
| 0 | 0.023 | 0 | 0 | 0 |
| 0 | 0 | 0.047 | 0 | 0 |
| 0 | 0 | 0 | 0.023 | 0 |
| 0 | 0 | 0 | 0 | 0.016 |

The result of this directional filtering step (10) is sent to a summator circuit so as in a step (11) to recompose the multiresolution pyramids $P'_n$ via the equation $$P'_n = E_2(P'_{n+1}) + T_n \quad (n<N)$$

with $P'_N = T_N$

This therefore yields $$P'_{N-1} = E_2(T_N) + T_{N-1}$$

The procedure is repeated iteratively to obtain $P'_0$ which represents the matrix constituting the map of disparities.

These steps of the two variant embodiments of the invention are implemented with the aid of microprocessor circuits executing the appropriate programs making it possible to carry out the steps set out earlier. These circuits also comprise storage means for storing, moreover, programs to be executed, the matrices of pixels or the matrices of regions or again the intermediate results making it possible to expect the next calculation step or again the filters to be applied to the intermediate or final results.

This is used to compare the subjective performance of various coder apparatuses or again to compare the subjective performance of various coding algorithms and/or to measure the perception of artefacts due to image processing. Depending on this performance, the calculation circuit implementing one of the two variant embodiments of the invention can modify the coding by, for example, retroacting the measurement of subjective quality of the coded images thus performed on the global and/or local parameters of the coding. A global parameter on which the retroaction may be performed can, for example, be the mean bit rate and a local parameter can, for example, be the local quantization interval used during the coding. This retroaction can be dynamic during coding, the errors retroacting on the local quantization interval, the size of the images, the form of the GOP (Group of pictures) etc. The retroaction can also be performed iteratively in the case of codings for video disc (DVD) or CD-ROM. In this case, so long as the error is above a threshold and/or is not homogeneous over the whole image, the retroaction of the calculation circuit operates a decrease in the severity of the coding parameters globally and/or locally. So long as the error is below a threshold, the measurement of the subjective quality of the images performed by the calculation circuit makes it possible to increase the severity of the coding parameters.

Lastly, a penultimate use of the method of estimating or of measuring the subjective quality of a sequence of images emanating from a coder can relate to object oriented coding. In this case, the use of the calculation device of one of the methods implemented by this device makes it possible to ensure a constant subjective quality of the various objects of the scene or to ensure a given inter-object relative subjective quality. Lastly, the estimation process and device can make it possible to modify the conditions of dynamic reallocation of the bit rates allocated to each of the channels of a broadcast with statistical multiplexing so as to ensure a given and homogeneous subjective quality of the programmes broadcast.

Other modifications within the scope of the person skilled in the art also form part of the spirit of the invention.

A variant embodiment of the invention consists in using, as signal representative of the estimation of the field of motion, the per-macroblock motion vectors emanating from the procedure for coding/decoding the decoded image, for example during the MPEG-type coding.

Another variant embodiment of the invention consists in replacing the decoded image by a noisy source image. The latter can be constructed for example on the basis of the source image to which white noise is added (random variable uniform in all the spatial frequency bands). The disparity maps obtained can then be regarded as a prediction of the zones of the image where the coding errors will be most perceptible "a priori", that is to say before having performed the coding proper.

These disparity maps may then be used in the implementation of devices for preprocessing the source images for the purpose of preventing the generation of artefacts or coding defects during a future coding procedure. A preprocessing device consists for example of a circuit for prefiltering and/or for reducing the energy in the high frequencies, in the zones of the image where the visibility of the coding artefacts is lowest, zones supplied by the disparity maps.

These "a priori" disparity maps can be used to further reduce the bit rate necessary for coding in the zones where the visibility of the coding artefacts is predicted to be lower "a priori".

These "a priori" disparity maps can also be used to locally measure the amount of "hidden" information which can be inserted into the source or decoded images without being perceptible (Watermarking).

APPENDIX 1

Method 1

Step 1 Precorrection of images: Gamma Correction of the screen and Contrast Correction (Weber's law).

Step 2 Construction of the Field of Motion image based on the Source Sequence and for each image.

Step 3 Segmentation of the Field of Motion. For each image, a Segmentation into Regions is thus available, based on the Motion information. Each Region(v) is therefore characterized by a velocity vector v. Each pixel of each image (Source or Decoded) belongs to a Region corresponding to an estimated velocity v (in cycles per degree).

Step 4 For each Region(v), Construction of the corresponding Psychovisual Filter, on the basis of a BDD filter $\{H(f_s,v_i)_{i=1,...N}\}$ and interpolation of the filters.

Step 5 For each Region(v), Synthesis of the Spatial Filter by inverse FFT: $h(s,v)=FFT^{-1}[H(f_s, v)]$ Step 6 Filtering of the Source and Decoded images to obtain two other images:

SourceF and DecodedF.

Each pixel P of the Source/Decoded image is filtered by the Filter h(s,v), corresponding to the Region(v) to which P belongs, centred on P and applied to the Source/Decoded image.

Step 7 Construction of the Map of Disparities or psychovisual Errors $Err=(SourceF-DecodedF)^n$ (n=Z or other)

APPENDIX 2

Method 2

Step 1 (see Method 1).
Step 2 (see Method 1).
Step 3 (see Method 1).
Step 4 (see Method 1).
Step 5 Decomposition of the Source and Decoded images into a Laplace Pyramid of N levels constructed in two steps:

Each level $P_n$ is firstly obtained by ½ Decimation-Filtering (low-pass) of the immediately preceding level (multiresolution pyramid, FIG. 4).
$P_n = F_{1/2}(P_{n-1})$ n>0
$P_0$=original image
Then from each level Pn is deducted the immediately succeeding level expanded by 2 so as to obtain $L_n$ (Laplace pyramid, FIG. 5).
$L_n=P_n-E_2(P_{n+1})$ n<N
$L_N=P_N$ This calculation makes it possible to obtain a representation of a multiresolution pyramid $P_n$ in accordance with FIG. 4 and a representation of a Laplace pyramid $L_n$ in accordance with FIG. 5.

If the Filter $F_{1/2}$ is well chosen, the image $L_n$ is a good approximation of the energy included within a frequency band centred around $f_n=1/(n+1)$.

Finally, two Laplace Pyramids are available: $LS_n$ (Source) and $LD_n$ (Decoded).

Step 6 By the same principle, the multiresolution Pyramid $R_n$ of the Regions image is constructed by replacing $F_{1/2}$ by $G_{1/2}$ ½ Decimation/median Filter. Thus, for each pixel of each level of the Laplace Pyramids (Step 5), the local value of the motion is available.

Step 7 Calculation of the level-to-level inter-Pyramid Differences:

$Diff_n=LS_n-LD_n$

Step 8 Application of the principle of frequency masking (Texture/Masking): The relative influence of the activity at the frequency $f_n$ is masked by considerable activity in the higher frequencies $(f_{k<n})$.

The relative local influence of pixel pi, $I_n$(pi) is then defined by:

$$I_n = \frac{E_n}{\sum_{k<n} m(E_k)} \text{ with: } E_n = (Diff_n(pi))^q$$

with q=2 for example.

Step 9 Filtering of the Source and Decoded Laplace Pyramids.

Each pixel pi of $L_n$ is weighted by the value $H(f_n,v)$, corresponding to the Region(v) to which pi belongs in $R_n$, and by the relative influence $I_n$.

$T_n(pi)=I_n(pi) \times H$

Step 10 Directional Filtering: to take account of the psychovisual directions favoured by the human gaze, it is possible to filter the images $T_n$ by directional filters which favour one direction with respect to others.

Step 11 Construction of the Map of Disparities or psychovisual Errors: the multiresolution pyramids $P'_n$ are recomposed:

$P'_n = E_2(P'_{n+1}) + T_n (n<N)$ $P'_N = T_N$

The Map of disparities corresponds to $P'_0$.

The invention claimed is:

1. A method for evaluating the quality of coded images, the method comprising:
   a) processing a signal representative of an image so as to obtain a processed signal,
   b) constructing, a motion vector field by estimating motion between image sequences in the signal representative of the image to get velocity vectors,
   c) segmenting the motion vector field according to a motion value of the velocity vectors to get regions,
   d) determining a psychovisual human filter to be applied as a function of an estimated velocity of each region,
   e) psychovisual filtering the processed signal, and
   f) constructing a map of disparities between the signals representative of the image which are obtained after the psychovisual filtering step and signals representative of a decoded image which are obtained after the psychovisual filtering step.

2. The method according to claim 1, further comprising the step of applying each of the preceding steps to a source image and to the decoded image.

3. The method according to claim 1, further comprising the step of frequency decomposing the images which precedes the psychovisual filtering step and includes the step of weighting by a coefficient deduced from curves taking into account the estimated velocity and the frequency band considered, so as to take account of the relative influence of the velocity and of the spatial frequency on the perception of the moving images.

4. The method according to claim 1, wherein the psychovisual filtering step is applied to matrices representative of the inter-pyramid differences between the Laplace pyramids of processed source images and those of the processed decoded images after weighting by, the local influence representative of the frequency of the pixel, pi, concerned and a filtering coefficient deduced from filtering curves taking into account the estimated velocity and the frequency band corresponding to the level of the Laplace pyramid to which the pixel belongs in a multiresolution pyramid obtained by constructing a pyramid on the basis of the image of each region of different velocity.

5. The method according to claim 1, wherein psychovisual filtering curves are either derived from a succession of curves arranged in the form of a database and stored in the system or obtained by analytical representation implemented by calculation means making it possible to calculate each curve.

6. The method according to claim 4, wherein the step of constructing the map of disparities is performed by recomposing the filtered multiresolution pyramids obtained in the preceding step.

7. The method according to claim 4, wherein the step of processing the image includes the steps of
   decomposing source and decoded images into a Laplace pyramid of n levels and
   constructing the inter-pyramid difference.

8. The method according to claim 1, wherein the velocity or local value of the motion is obtained by possible construction of filters followed by application of the filter constructed or by application of a median filter.

9. The method according to claim 1, further comprising the step of precorrecting the images by performing a Gamma correction and a correction by Weber's law.

10. The method according to claim 9, wherein the Gamma correction is performed in accordance with:

$y = K_S V'_s$ with $V = k_\alpha E'_\alpha$ in which y is the luminance, V the luminance voltage, E the illumination of the illumination analysed image, $\gamma_S$ is an exponent of around 2.2 for black and white picture tubes and $\gamma_\alpha$ has a value of 0.45 commonly agreed for colour television.

11. The method according to claim 1, wherein the psychovisual filtering step includes the steps of
   constructing the psychovisual filter corresponding to the velocity estimated on the basis of a database of filters and
   interpolating between two filters corresponding to the regions closest to the region whose velocity has been estimated.

12. The method according to claim 4, wherein the relative local influence ($I_n$) of the pixel $p_i$ concerned is obtained by calculating a value $E_n$ representing the $q^{th}$ power of the inter-pyramid level-to-level difference between the source pyramids and decoded pyramids of like level of the pixel concerned.

13. The method according to claim 12, wherein the calculation of $I_n$ is performed by using the following formula:

$$I_n = \frac{E_n}{\sum_{k<n} m(E_k)}$$

with $E_n = (\text{Diff}_n, (p_{ij}))^q$
$m(E_k) = E_k$ if $E_k > S$
and $m(E_k) = S$ if $E_k < S$
with for example S=0.5% (maximum possible value of $E_k$).

14. The method according to claim 4, wherein the psychovisual filtering includes the step of directional filtering the images in a determined direction rather than in another.

15. The method according to claim 9, wherein the Gamma correction is performed by a calculation device implementing the following equation:

$$L_{display} = L_{\max}\left(\frac{e}{e_{\max}}\right)^\gamma$$

e being the grid level value of the pixel, $e_m$ being the maximum value example 256 if the coding is performed on 8 bits, $L_{max}$ being the intensity corresponding to $e_{max}$ in cd/m².

16. The method according to claim 9, wherein Weber's law is implemented by a calculation device which carries out the following function:

$$V_{out} = \frac{L_{\max}}{2} \text{Log}_{10}\left(1 + 100\frac{L_{display}}{L_{\max}}\right)$$

17. The method according to claim 1, wherein the calculation of the psychovisual filter is obtained through the following formula:

$$G(\alpha,v)=[6.1+7.3|\log(v/3)^3]\times v\alpha^2 \exp[-2\alpha(v+2)/4.59]$$

with $\alpha'=2\pi$, f=spatial frequency, v=velocity.

18. The method according to claim 1, further comprising the step of coding the image such that the coding is modified by retroacting the measurement of disparities on a coding parameter.

19. The method according to claim 18, wherein the calculated disparities are compared with a threshold so as to modify coding parameters until the desired threshold is overstepped.

20. The method according to claim 19, wherein one of the parameters is either the quantization interval, or the size of the images, or the form of the group of pictures GOP.

21. The method according to claim 18, wherein the homogeneity of the calculated disparities is analysed so as to act on the coding parameters.

22. The method according to claim 18, wherein the coding parameters of the different objects of an image whose coding is object oriented are modified as a function of a constant desired disparity.

23. The method according to claim 18, further comprising the step of performing a dynamic reallocation of bit rates allocated to a coding apparatus with multiplexing.

24. A device for evaluating the quality of coded images, the device comprising:
  means for processing a signal representative of a source image and of a decoded image so as to obtain a processed source image signal and a processed decoded image signal,
  means for constructing on the basis of the signal representative of each of the images, a signal representative of the estimating of the field of motion on the basis of each of the images of the source and decoded sequences,
  means for building a signal representative of the segmenting of the field of motion and of storing the image pixels representative of each region $R_i$ having a different field of motion at an address defined with respect to the velocity vectors estimated in the step of constructing the field of motion making it possible to determine for each of the source and decoded images those having different velocity vectors,
  a means for determining a psychovisual human filter to be applied as a function of the estimated velocity of the region,
  means for psychovisual filtering applied to each of the processed source images and processed decoded images and
  means for constructing a map of disparities between the signals representative of the processed source image which are obtained after the filtering and the signals representative of the processed decoded image which are obtained after the filtering.

25. The device according to claim 24, wherein the psychovisual filtering means are applied to matrices representative of the inter-pyramid differences calculated by the determination means between the Laplace pyramids of the processed source images and those of the processed decoded images after weighting by the local influence representative of the frequency of the pixel concerned and a filtering coefficient—deduced from stored or calculated filtering-curves and taking into account the estimated velocity and the frequency band corresponding to the level of the Laplace pyramid to which the pixel belongs in a multiresolution pyramid obtained by means for constructing this multiresolution pyramid on the basis of the image of each region of different velocity.

26. The device according to claim 24, wherein the means for constructing the map of disparities performs a recomposition of the filtered multiresolution pyramids.

27. The device according to one of claim 24, wherein the means for processing, the means for building, the means for determining, the means for constructing, the means for filtering comprise at least one microprocessor associated with memories sufficient to contain programs for embodying the various means and to contain databases and intermediate information necessary for the calculation and for obtaining the map of disparities.

28. The method according to claim 1, the images being coded according to the MPEG standard, wherein the step of constructing a signal representative of the field of motion image exploits the per-macroblock motion vectors calculated during the coding of the images according to the MPEG standard.

29. The method according to claim 1, wherein the decoded image is a noisy source image constructed on the basis of the source image to which white noise is added.

30. The method according to claim 29 further comprising the steps of
  predicting, on the basis of the map of disparities, the regions most sensitive "a priori" to the coding errors and
  coding the regions as a function of this prediction.

31. The method according to claim 29 further comprising the step of prefiltering a source images as a function of the map of disparities.

32. The method according to claim 29 further comprising the step of determining locally the amount of information which can be inserted into the images (Watermarking) without this addition being perceptible.

* * * * *